United States Patent [19]

Anderson

[11] 4,042,345

[45] Aug. 16, 1977

[54] PROCESS FOR CONVERSION OF SOLID REFUSE TO FUEL GAS USING PELLETIZED REFUSE FEED

[75] Inventor: John Erling Anderson, Katonah, N.Y.

[73] Assignee: Union Carbide Corporation, New York, N.Y.

[21] Appl. No.: 675,935

[22] Filed: Apr. 12, 1976

[51] Int. Cl.² ............................................. C10J 3/00
[52] U.S. Cl. ..................................... 48/209; 252/373
[58] Field of Search ................... 48/197 A, 111, 204, 48/209, 202; 252/373

[56] References Cited

U.S. PATENT DOCUMENTS

| 749,302 | 1/1904 | Koneman | 48/204 |
|---|---|---|---|
| 3,426,673 | 2/1969 | Miner et al. | 100/37 |
| 3,692,505 | 9/1972 | Reichl | 48/202 |
| 3,729,298 | 4/1973 | Anderson | 48/111 |
| 3,841,851 | 10/1974 | Kaiser | 48/111 |
| 3,926,582 | 12/1975 | Powell et al. | 48/209 |

OTHER PUBLICATIONS

"Professional Engineer", vol. 45, No. 11, Energy from Municipal Refuse: A Comparison of 10 Processes, Schulz, pp. 20–24.

Primary Examiner—S. Leon Bashore
Assistant Examiner—Peter F. Kratz
Attorney, Agent, or Firm—Lawrence G. Kastriner

[57] ABSTRACT

A process for simultaneously disposing of refuse and producing a useful fuel or synthesis gas and an inert inorganic residue by feeding shredded refuse, from which ferrous metal has preferably been magnetically separated, and which has been compacted into hard pellets, into an oxygen fed pyrolizing, slagging shaft furnace.

5 Claims, 2 Drawing Figures

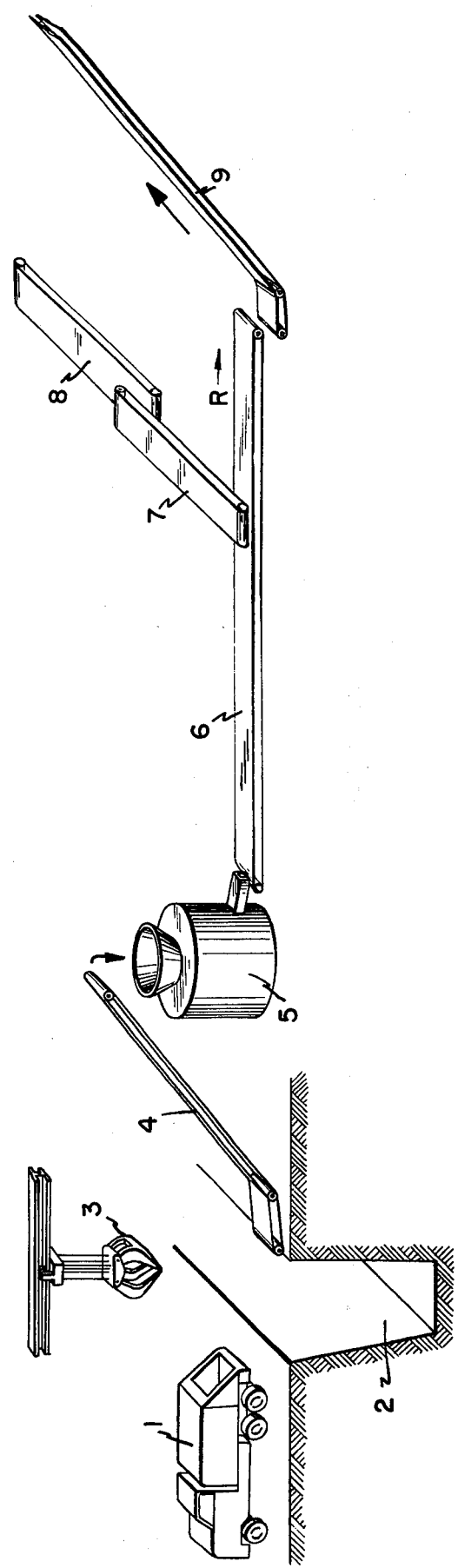

PROCESS FOR CONVERSION OF SOLID REFUSE TO FUEL GAS USING PELLETIZED REFUSE FEED

BACKGROUND

This invention relates in general to a solid waste disposal and resource recovery process which produces a useful fuel or chemical synthesis gas, and more particularly, to an improvement upon the process disclosed in U.S. Pat. No. 3,729,298, hereinafter referred to as the Anderson process.

Historically, the least expensive method for disposing of solid waste has been open dumping. However, unprocessed garbage dumps produce severe problems of ground water pollution through leaching, loss of land value, fire hazards and rodent infestation. A more acceptable method, sanitary landfilling has reduced these problems by composting and covering the garbage with earth. Nevertheless, in large metropolitan areas, this practice has become increasingly unattractive as acceptable sites become more scarce. Both of these methods have been supplemented by incinerating the waste before landfilling. While conventional incineration provides significant reductions in the volume of the refuse and some alleviation of the pollution caused by leaching, it introduces new environmental problems such as air pollution, and though volume reductions of 80 to 90 percent are possible, the residue or ash is not biologically inactive and therefore landfilling is still required. Furthermore, resource recovery from conventional incineration tends to be minimal.

One solution to the above problems is disclosed and claimed in U.S. Pat. No. 3,729,298; the disclosure of which is incorporated herein by reference. In summary, the Anderson process disclosed in said patent comprises feeding refuse into the top, and oxygen into the base of a vertical shaft furnace. The furnace (or converter) can be described in terms of having three functional zones; a drying zone at the top, a thermal decomposition or pyrolysis zone in the middle, and a combustion and melting zone (or hearth) at the base. These zones are not clearly distinct; that is, there is no sharp line separating them. As the refuse descends in the furnace, it is first dried by the hot gas which rise through the furnace and then pyrolysed. Pyrolysis is a process whereby organic matter in the refuse is decomposed and thermally cracked in an oxygen-deficient atmosphere with the generation of a CO, $H_2$ and a char like material. As the refuse moves down through the pyrolysis zone, it is converted to volatile materials which rise and char which descends into the combustion zone. There it is combusted with oxygen, causing the generation of carbon monoxide and carbon dioxide which produce the heat required to melt the inorganic solids in the refuse, such as glass and metal. The molten slag is continuously tapped from the converter, and quenched in a water bath. A gas containing at least 50% (on a dry basis) of a CO and $H_2$ mixture is discharged from the top of the furnace. Following cleanup, the gas is ready for use as a medium BTU fuel gas or for chemical synthesis.

With natural resources becoming increasingly scarce, there has been an increasing demand to recover them from waste material. It is well known that shredding of refuse prior to further processing is necessary if ferrous metals as well as other material such as tin, aluminum or glass is to be recovered from the refuse by any practical and economical technique. Such recovery processes make use of magnetic fields, electric fields or air classification to separate various components of the shredded refuse. The degree of shredding will vary considerably depending on the nature of the separation process used, as well as the resource to be recovered from the refuse. Although ferrous metal is among the easiest to recover from shredded refuse by magnetic separation, it cannot easily or economically be extracted and purified from the slag-metal residue produced by the Anderson process.

It has been found that when shredded refuse is fed into a shaft furnace and processed in accordance with the Anderson process, it tends to compact so tightly as to restrict the flow of gases through the shaft required for proper functioning of the process. These problems become particularly acute if the furnace is run over a long period of time. One of the problems caused by packing of shredded refuse is that the gas rising from the hearth does not flow uniformly through the entire cross-section of the refuse bed and tends instead to be restricted to a few passages. These passages become enlarged as pyrolysis of the refuse and oxidation of the resultant char occur, eventually leading to the formation of one large channel through which most of the gases then flow. Such channeling reduces the efficiency of the process considerably, since the hot gases from the hearth passing up through the channel have insufficient time and surface contact area to transfer the heat necessary for the gassification, pyrolysis and drying processes to take place. Consequently, the gases leave the top of the furnace at a high temperature, resulting in lower thermal efficiency, an increase in oxygen consumption and a decrease in the BTU value of the product gas.

OBJECTS

It is an object of this invention to adapt the process described in U.S. Pat. No. 3,729,289 so as to render it capable of operating efficiently when utilizing shredded refuse as the feed material.

It is another object of this invention to provide a process for disposing of shredded refuse, from which the bulk of ferrous metal has been separated, while simultaneously producing a useful fuel or synthesis gas therefrom.

It is still another object of this invention to provide a process for disposing of solid waste and recovery of natural resources by an oxygen-pyrolysis process wherein ferrous metal is recovered from the shredded waste which is thereafter converted to a useful gas and an inert solid residue.

SUMMARY

These and other objects which will be apparent to those skilled in the art are achieved by the present invention, which comprises:

In a process for disposing of refuse while simultaneously producing a useful gaseous product and an inert solid residue, comprising the steps of (a) feeding refuse into the top portion of a vertical shaft furnace, (b) feeding an oxygen containing gas into the base of said furnace, (c) pyrolysing the organic portion of the refuse, (d) fluidizing the inorganic portion of the refuse, (e) discharging the gaseous products from the top of said furnace, and (f) tapping the fluidized inorganic material from the base of said furnace, the improvement comprising:

feeding the refuse into the furnace in the form of pellets of compacted refuse, said pellets being characterized by having:

(1) a density greater than that given by the equation:

$$D = 2,000/(100 - 0.8A)$$

where:
- $D$ = the density of the pellet (lbs/ft.$^3$),
- $A$ = percent inorganics in the refuse pellet, and 2. a surface to volume ratio greater than that given by the equation:

$$R = 15(G/H)^{0.625}$$

where:
- $R$ = the ratio of the surface area to the volume of the pellet (ft.$^2$/ft.$^3$)
- $H$ = the height of the refuse bed in the furnace (ft.)
- $G$ = the refuse feed rate (tons/day/ft.$^2$ of furnace cross-sectional area).

Preferably, the process is carried out by utilizing a gas containing at least 40% oxygen (by volume) as the oxygen containing feed gas. It is also preferred that the weight ratio of oxygen to refuse feed be maintained in the range of from 0.15:1 to 0.28:1. However, the advantages resulting from the present invention will also benefit the process when operated outside the preferred conditions and ranges specified above.

THE DRAWINGS

FIGS. 1a and 1b are conceptual flow diagrams illustrating the refuse disposal and resource recovery process of the present invention.

DETAILED DESCRIPTION OF THE INVENTION

Figure 1B:
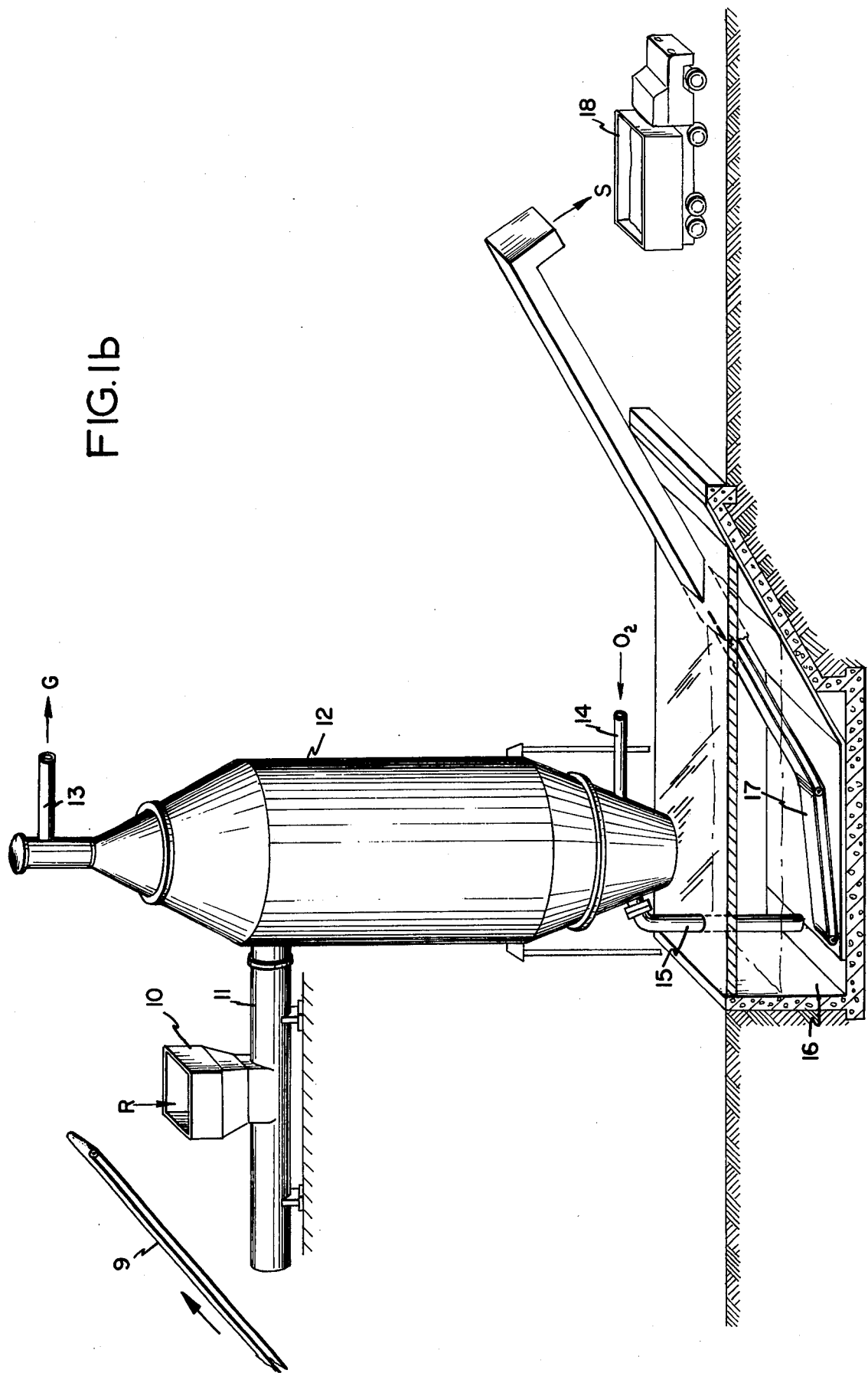

It is to be understood that the term "refuse" as used herein is intended to include any solid waste; that is, any type of municipal, industrial, commercial or agricultural waste material. Such material is normally composed of varying quantities of organic and inorganic matter such as paper, plastics, rubber, wood, glass, food waste, leaves, water, tin cans and other scrap metal products. It is also possible to mix sewage sludge with the refuse and thereby dispose of this material as well.

As used herein, the term "shredded" as applied to the refuse is intended to include a wide range of particle size, as well as any type of size reduction technique, since both these factors are primarily dependent upon the nature of the pretreatment to which the refuse may be subjected for resource recovery purposes prior to pyrolysis. Thus, the shredding may consist of several stages of comminution to a very fine particle size, or it may involve only minimal break-up of gross structures or the breaking open of plastic bags to expose their contents — as with a flail mill. In those instances where the raw solid waste is by nature sized sufficiently small that it can be pelletized directly, mere segregation of oversized objects may suffice; the main criteria being the ability of the refuse to be compacted into strong pellets.

The overall operation of the refuse disposal and resource recovery process of the present invention can more easily be understood by reference to the drawings. Refuse is normally delivered to the disposal facility in refuse collection or transfer trucks 1 which dump the refuse into a pit 2. Crane 3 mixes the refuse in the pit in order to help insure a relatively uniform supply of material. Such a pit should have a capacity equal to several days of continuous operation in order to provide a relatively uniform feed of material as well as to prevent having to shut down operations over weekends when refuse from municipalities is not ordinarily collected. Crane 3 loads the refuse on to the conveyor 4 which feeds the refuse in its as-received condition to a shredder 5 where the refuse is reduced in size to approximately 4-6 inches across the greatest dimension of the particle discharged from shredder 5. The shredded refuse is then conveyed by conveyor 6 to a conventional magnetic belt separator 7 which removes about 95% of the ferrous material from the refuse. The ferrous material is dropped onto conveyor 8 which transports it to a transfer trailer (not shown) for hauling to a metal recovery plant. The remainder of the shredded refuse, which is substantially free of magnetic metal, drops on conveyor 9 which transports the refuse R to hopper 10 which feeds the refuse to a high pressure pelletizer 11 located near the top of furnace 12. Pelletizer 11 compacts the refuse to the desired size and density.

The pelletizer 11 also feeds the shredded refuse pellets directly into the top section of shaft furnace 12. The densely compacted refuse pellets provide a seal preventing the gases from leaking out of the furnace through the refuse feed port. The product gases G are discharged from the top of furnace 12 through discharge duct 13. These gases containing at least 50% by volume of CO plus $H_2$ (on a dry basis) may be used either as a fuel gas or as a synthesis gas for chemical processing, for example, to be converted to ammonia. The base of furnace 12 contains the hearth section, which includes means for injecting oxygen through one or more tuyeres 14, and a slag tap for discharging the fluidized metal and slag, which flows through a slag duct 15 into a water filled quench tank 16. The water in the quench tank, which causes the slag to solidify and break up into a finely divided inert solid inorganic residue, also provides a water seal to prevent the gases from leaking out of furnace 12 which is operated under a slight positive pressure. A drag conveyor 17 may be used to remove the solidified residue S from quench tank 16 and to drop it into a collection vessel such as a dump truck 18.

The strength of the pellets, as best defined by their density, and the surface to volume ratio of the pellets are of critical importance to proper operation of the furnace. The pellets must be sufficiently strong to remain intact within the furnace as they move down through the drying and pyrolysis zones. This is necessary in order that they provide a porous structure within the furnace to enable the gases to rise through the entire cross-section of the bed in such manner as to provide a good gas-solids contact area necessary for heat transfer. It has been unexpectedly found that drying increases the strength of the pellets. Hence, the pellets increase in strength as they progress down the shaft furnace. It is the presence of such coherent pellets throughout the height of the bed that prevents the bed from becoming a solid gas impervious mass, while at the same time enabling the pellets to move relative to each other as the refuse is consumed by the pyrolysis and combustion processes which take place within the furnace. By movement of the pellets relative to each other, large channels tend to be closed as pellets drop into the channel. In addition, the bed will continuously rearrange itself as refuse is consumed, thereby preventing sudden large instabilities from occurring which would lead to collapse of the bed.

A refuse pellet too low in density will lack sufficient structural strength and will tend to break up as it is fed into the furnace. This result causes the same type of phenomena to occur as occurs when unpelletized shredded refuse is fed into the furnace.

It has been found that in order to provide a refuse pellet having sufficient structural strength to remain coherent in the above process it must have a density greater than that given by the equation:

$$D = 2000/(100 - 0.8A)$$

where:
$D$ = the density of the pellet (lbs./ft.$^3$)
$A$ = percent inorganics in the refuse pellet.

When the refuse pellets are sufficiently dense to have the necessary structural strength, the drying and pyrolysis reactions become limited by the rate of heat transfer and diffusion within the pellet. For optimum performance, the surface to volume ratio of the pellets should be greater than that given by the equation:

$$R = 15(G/H)^{0.625}$$

where:
$R$ = the ratio of the surface area to the volume of the pellet (ft.$^2$/ft.$^3$).
$H$ = the height of the refuse bed in the furnace (ft.)
$G$ = the refuse feed rate (tons/day/ft.$^2$ of furnace cross-sectional area).

If a pellet has a surface to volume ratio which is lower than that calculated from the above equation, the energy of the rising gases in the shaft furnace will be insufficiently utilized, causing the temperature of the product gas to rise, and as previously noted, such high off gas temperatures cause inefficient operation in terms of higher oxygen consumption and the production of a gas having a lower heating value.

The high density pellets required for the present invention are to be distinguished from compacted refuse made by ordinary household or industrial refuse compacters. Those normally compact material to only about one-third of its original volume, using ram pressures in the neighborhood of 30 psi. Such compaction is entirely inadequate for providing pellets of the size and density required in the present process. Apparatus suitable for producing pellets of the type required in the present invention is described in copending application Ser. No. 675,934, filed of even date herewith.

While the present invention will function satisfactorily with pellets made from any form of refuse as long as it is capable of being pelletized to the density and surface to volume ratio specified, the pellets are preferably made from shredded refuse. It is also preferred that most of the ferrous metal be removed from the shredded refuse prior to being compacted into pellets. The preferred range of pellet density is 25 to 50 lbs./cu.ft.$^3$.

EXAMPLE

The following example will serve to illustrate the process of the present invention. Cylindrical pellets of municipal refuse having a density of 30-40 lbs./ft.$^3$, a diameter of 13 inches, and lengths varying from 5-8 inches, produced by compacting pressures of 400-1000 psi, were fed at an average rate of about 100 tons/day into a vertical, refractory-lined, metal shaft furnace having an inside diameter of 10 ft. and an overall bed height of about 20 ft. The surface to volume ratio of the pellets varied from 6.7 to 8.5 ft.$^2$/ft.$^3$. The compacting pressure and pellet length varied due to variations in the amount of moisture in the refuse and due to variations in the composition of the refuse. Steady state conditions were established after the furnace had been operating for about 24 hours. Operation of the furnace was smooth and efficient as indicated by a steady product gas rate, steady pressure drop across the bed, and by the low temperature, (300°-600° F) of the off gas leaving the furnace. Oxygen feed during the run was maintained within the range of 0.17 to 0.22 tons oxygen/ton refuse.

What is claimed is:
1. In a process for disposing of refuse while simultaneously producing a useful gaseous product and an inert solid residue, comprising the steps of (a) feeding refuse into the top portion of a vertical shaft furnace and forming a bed of said refuse within the furnace, (b) feeding an oxygen containing gas into the base of said furnace, (c) pyrolysing the organic portion of the refuse, (d) fluidizing the inorganic portion of the refuse, (e) discharging the gaseous products from the top of said furnace, and (f) tapping the fluidized inorganic material from the base of said furnace, the improvement comprising:
feeding the refuse into the furnace in the form of pellets of compacted refuse, said pellets being of sufficient structural strength to remain coherent at least within the drying and pyrolysis zones of the furnace, in order to inhibit channeling and to provide a porous structure throughout the height of the refuse bed, said pellets having:
1. a density greater than that given by the equation:

$$D = 2,000/(100 - 0.8A)$$

where:
$D$ = the density of the pellet (lbs./ft.$^3$), and
$A$ = percent inorganics in the refuse pellet, and
2. a surface to volume ratio greater than that given by the equation:

$$R = 15(G/H)^{0.625}$$

where:
$R$ = the ratio of the surface area to the volume of the pellet (ft.$^2$/ft.$^3$)
$H$ = the height of the refuse bed in the furnace (ft.)
$G$ = the refuse feed rate (tons/day/ft.$^2$ of furnace cross-sectional area).

2. The process of claim 1 wherein the refuse has been shredded prior to being compacted into pellets.

3. The process of claim 2 wherein most of the ferrous metal has been magnetically separated from the shredded refuse prior to being compacted into pellets.

4. The process of claim 1 wherein the density of said pellets is in the range of from 25 to 50 lbs./ft.$^3$.

5. The process of claim 1 wherein said oxygen containing gas contains at least 40% oxygen, and wherein the weight ratio of oxygen to refuse fed to the furnace is maintained within the range of from 0.15:1 to 0.28:1.

* * * * *